US010970341B2

(12) United States Patent
Hassan (10) Patent No.: US 10,970,341 B2
(45) Date of Patent: Apr. 6, 2021

(54) PREDICTIVE MODELING IN EVENT PROCESSING SYSTEMS FOR BIG DATA PROCESSING IN CLOUD

(71) Applicant: SAP SE, Walldorf (DE)

(72) Inventor: Ahmad Hassan, Belfast (GB)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 15/677,571

(22) Filed: Aug. 15, 2017

(65) Prior Publication Data

US 2019/0057151 A1  Feb. 21, 2019

(51) Int. Cl.
| | | |
|---|---|---|
| *G06F 15/16* | (2006.01) | |
| *G06F 16/951* | (2019.01) | |
| *H04L 29/08* | (2006.01) | |
| *G06F 16/14* | (2019.01) | |
| *G06F 16/901* | (2019.01) | |
| *H04L 29/06* | (2006.01) | |
| *H04L 12/58* | (2006.01) | |

(52) U.S. Cl.
CPC .......... *G06F 16/951* (2019.01); *G06F 16/144* (2019.01); *G06F 16/9027* (2019.01); *H04L 51/12* (2013.01); *H04L 63/0245* (2013.01); *H04L 63/1425* (2013.01); *H04L 67/327* (2013.01)

(58) Field of Classification Search
CPC .................................................. G06F 16/951
See application file for complete search history.

(56) References Cited

U.S. PATENT DOCUMENTS

| | | | | |
|---|---|---|---|---|
| 9,721,229 | B1* | 8/2017 | Hernandez | G06Q 50/01 |
| 9,911,130 | B1* | 3/2018 | Battisti | G06Q 30/0631 |
| 2008/0005476 | A1* | 1/2008 | Venkatesan | G06F 12/0802 |
| | | | | 711/118 |
| 2014/0298168 | A1* | 10/2014 | Son | G06F 17/273 |
| | | | | 715/257 |
| 2015/0106927 | A1* | 4/2015 | Ferragut | H04L 63/1416 |
| | | | | 726/23 |
| 2015/0213631 | A1* | 7/2015 | Vander Broek | G06F 16/2477 |
| | | | | 345/589 |
| 2016/0323195 | A1* | 11/2016 | Rose | H04L 41/147 |
| 2017/0093902 | A1* | 3/2017 | Roundy | G06F 21/552 |

OTHER PUBLICATIONS

U.S. Appl. No. 14/704,461, Ahmad Hassan, filed May 5, 2015.
(Continued)

*Primary Examiner* — Alex Gofman
(74) *Attorney, Agent, or Firm* — Fish & Richardson P.C.

(57) ABSTRACT

Methods, systems, and computer-readable storage media for predicting a type of an event in a computer-implemented system, implementations including receiving event data including a set of features representative of an event, determining a probability for at least one feature in the set of features from a data structure that stores a plurality of feature-probability pairs, the data structure representative of a type of event, providing a joint probability based on the probability of the at least one feature, the joint probability indicating a likelihood that the event is of the type of event, comparing the joint probability to a threshold to provide a comparison, and selectively executing one or more actions based on the comparison.

20 Claims, 4 Drawing Sheets

(56) References Cited

OTHER PUBLICATIONS

U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/213,621, Ahmad Hassan, filed Jul. 19, 2016.
U.S. Appl. No. 15/213,626, Ahmad Hassan, filed Jul. 19, 2016.
U.S. Appl. No. 15/213,654, Ahmad Hassan, filed Jul. 19, 2016.
U.S. Appl. No. 15/213,674, Ahmad Hassan, filed Jul. 19, 2016.
U.S. Appl. No. 15/213,754, Ahmad Hassan, filed Jul. 19, 2016.
U.S. Appl. No. 15/213,816, Ahmad Hassan, filed Jul. 19, 2016.
U.S. Appl. No. 15/213,861, Ahmad Hassan, filed Jul. 19, 2016.
U.S. Appl. No. 15/213,930, Ahmad Hassan, filed Jul. 19, 2016.
U.S. Appl. No. 15/213,960, Ahmad Hassan, filed Jul. 19, 2016.
U.S. Appl. No. 15/214,019, Ahmad Hassan, filed Jul. 19, 2016.
U.S. Appl. No. 15/214,082, Ahmad Hassan, filed Jul. 19, 2016.
U.S. Appl. No. 15/214,102, Ahmad Hassan, filed Jul. 19, 2016.

* cited by examiner

PREDICTIVE MODELING IN EVENT PROCESSING SYSTEMS FOR BIG DATA PROCESSING IN CLOUD

BACKGROUND

The term big data can refer to analytics (e.g., predictive analytics, user behavior analytics) over relatively large data sets, which can be so large that certain challenges are presented (e.g., capture, storage, analysis, curation, search, sharing, transfer, visualization, querying, updating, privacy). Challenges in the realm of big data have recently gained popularity due to the complexity introduced by such large data sets, and limited computing resources for processing such large data sets.

Cloud computing can be described as Internet-based computing that provides shared computer processing resources, and data to computers and other devices on demand. Cloud computing can support big data processing. In some examples, predictive models executed by cloud computing infrastructures can be trained on a relatively small subset of big data, and can apply predictive models to the larger set of incoming data. However, the amount of data produced by the systems has significantly increased in the recent past. How to predict future patterns in an event stream of relatively large amounts of data is still a complex research problem.

SUMMARY

Implementations of the present disclosure are generally directed to predicting occurrences of events in event streams. More particularly, implementations of the present disclosure are directed to predicting a type of event based on pre-calculated probabilities of event features. In some implementations, actions include receiving event data including a set of features representative of an event, determining a probability for at least one feature in the set of features from a data structure that stores a plurality of feature-probability pairs, the data structure representative of a type of event, providing a joint probability based on the probability of the at least one feature, the joint probability indicating a likelihood that the event is of the type of event, comparing the joint probability to a threshold to provide a comparison, and selectively executing one or more actions based on the comparison. Other implementations of this aspect include corresponding systems, apparatus, and computer programs, configured to perform the actions of the methods, encoded on computer storage devices.

These and other implementations can each optionally include one or more of the following features: the data structure includes a SPLAY tree, each node of the SPLAY tree including a feature-probability pair; actions further include processing historical event data to determine the probability of the at least one feature, and storing the probability in the data structure; the historical data is processed using a multinomial distribution; the type of event includes one or more of a security risk, a software failure, and a spam message; the event data is received by a real-time data processing system that is executed by one or more processors; and features include keywords associated with the event.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to predicting occurrences of events in event streams. More particularly, implementations of the present disclosure are directed to predicting a type of event based on pre-calculated probabilities of event features. Implementations can include actions of receiving event data including a set of features representative of an event, determining a probability for at least one feature in the set of features from a data structure that stores a plurality of feature-probability pairs, the data structure representative of a type of event, providing a joint probability based on the probability of the at least one feature, the joint probability indicating a likelihood that the event is of the type of event, comparing the joint probability to a threshold to provide a comparison, and selectively executing one or more actions based on the comparison.

Figure 1:
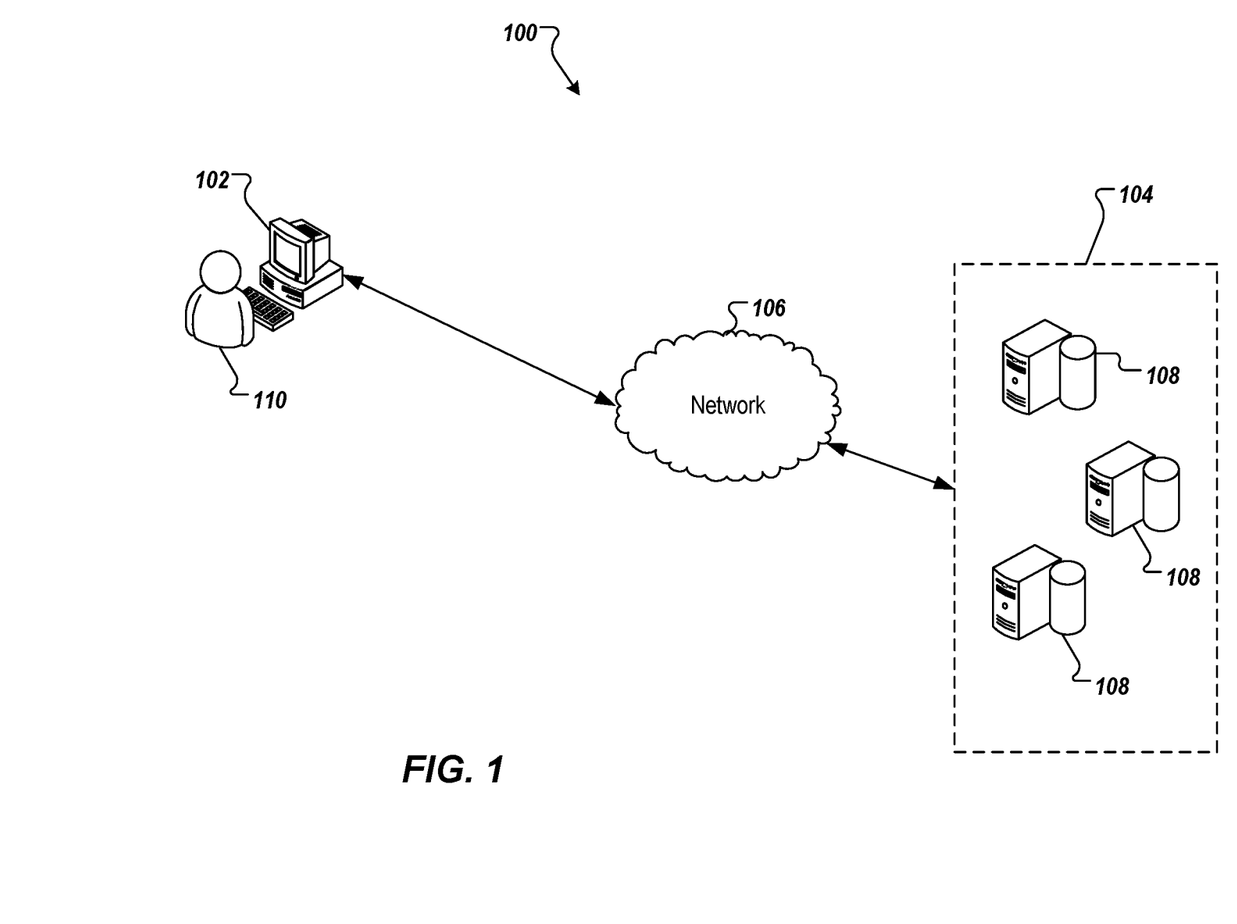
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a relevant event identification service (e.g., provided as one or more computer-executable programs executed by one or more computing devices). For example, an event stream (e.g., log data) can be provided to the server system (e.g., from the client device 102, and/or the server system 104), and the server system can process the input data through the relevant event identification service to identify events as being relevant to particular topics. Example topics can include, but are not limited to, software failures, security, spam filtering, and the like. In some examples, if a relevant event is identified, one or more actions can be implemented.

In some implementations, actions can be specific to a domain of the event. Example domains can include, without limitation, software failure prediction, and spam filtering. For example, if the domain is the software failure prediction, an event's 'interestingness' is defined to be an errors in the running process. In case of email spam filtering domain, an event is 'interesting' if the email is likely to be spam. Therefore, in case of software failure, an example action can include sending an alert to a monitoring system that the software has encountered a failure. In the case of spam filtering, the spam message can be marked as spam, and routed to a spam folder instead of an inbox.

As introduced above, predictive analytics in cloud infrastructures processing large data sets (big data) presents challenges in terms of computing resources expended. More generally, cloud computing enables virtual infrastructure on top of bare metal in order to share computing resources on large servers. Cloud computing enables offerings, such as, Infrastructure-as-a-Service (IaaS), Platform-as-a-Service (PaaS), and Software-as-a service (SaaS). Predictive analytics can be used in support of such offerings. For example, identifying relevant patterns in an event stream can be used to tailor service offerings, commission resources (e.g., processors, memory), and/or to provide data security (e.g., identify malicious activity). However, in the realm of big data, predictive analytics is a key research challenge. For example, thousands of events are regularly produced by different software products, resulting in relatively large (massive) data sets that are to be processed in predictive analytics.

In view of this context, implementations of the present disclosure provide a probabilistic model that is trained using multinomial distribution, and a limited training dataset. The trained model is stored in a SPLAY tree, which enables relatively fast look-ups, as described in further detail herein. Training of the probabilistic model is efficient relative to training of typical models. More particularly, the probabilistic model of the present disclosure provides for efficiency in that it need be trained with a relatively small sub-set of events, and keyword probabilities (for each keyword in an event) are stored in the SPLAY tree. Once the tree is populated with a set of keywords, and their probabilities, for each new event there is no need to find individual probabilities of each keyword. Instead, implementations of the present disclosure determine whether the number of keywords in the event match the same keywords in the SPLAY tree.

In further detail, and as described herein, an event is provided as a set of keywords. A probability of each keyword is calculated from the set of keywords in an event. In some implementations, each keyword is tagged as interesting or not interesting from a list of pre-defined keywords. If a keyword belongs to the predefined keyword list, then it interesting, otherwise it is not interesting. In some examples, the predefined keyword list is specific to a domain (e.g., software failure, spam filtering), and can be provided by a domain expert. For example for email spam filtering, the predefined keyword list can include email domains that are likely to generate spam emails. A probability is assigned to each keyword, which represents the probability of the keyword being interesting.

In some implementations, training of the probabilistic model can include, without limitation a set of historical events (e.g., socket failures, spam messages) is provided, and, for each event, corresponding keywords are provided. Accordingly, a superset of keywords (e.g., a list of all unique keywords in the set of events) is provided. In some examples, each keyword is tagged with metadata indicating whether the keyword as interesting, or not interesting (e.g., based on the list of predefined keywords) in view of the particular domain. In some examples, for each keyword, the number of times it is present in an event is determined (e.g., there are 100 events in the historical set (n=100), and keyword_1 appears 23 times (x=23)), and those values are processed using the equations described herein to provide respective probabilities (e.g., 12.8% for keyword_1).

In some implementations, and as introduced above, the trained model is stored as a SPLAY tree, which includes nodes having node names corresponding to respective keywords, and having node values corresponding to probabilities of each keyword with respect to a relevant event. For example, for an event that is relevant to security (e.g., hacking attempt on a system), a SPLAY tree is provided with respective keywords, and respective probabilities, each probability indicating a likelihood of the keyword being relevant to the event. Using the trained model relevant events can be identified relatively quickly, and efficiently with respect to computing resources. For example, the SPLAY tree is used to search keywords and determine respective probabilities, as described herein.

In some examples, a SPLAY tree is a dynamic data structure in that node positions can change based on accesses. For example, the most visited nodes are at the top of the tree (e.g., root node, intermediate nodes), and the least visited nodes are toward the bottom of the tree (e.g., lower level intermediate nodes, leaf nodes). By the property of the SPLAY tree data structure, a node becomes a root node when it is accessed. On every access the whole tree is restructured to make sure that the accessed node becomes the root node. Over time, nodes move toward the bottom of the tree, if they are not accessed.

In some implementations, event data can be captured in one or more logs. Each log can be processed in a resource-efficient manner, by comparing event keywords to one or more SPLAY trees (e.g., each SPLAY tree corresponding to a relevant event). In some implementations, and as described in further detail herein, a binomial theorem and multinomial distribution are used to enhance predictive analytics, while providing relatively high accuracy.

Implementations of the present disclosure consider an event stream that includes a plurality of events. In some examples a set of events (E) in an event stream is provided as:

$$E=(e_1, \ldots, e_n) \text{ or } E=\Sigma_{i=1}^n e_i$$

In some examples, each event $e_i$ includes a set of keywords (K), which can be provided as:

$$K=(k_1, \ldots, k_m) \text{ or } K=\Sigma_{j=1}^m k_j$$

In some examples, each event $e_i$ is defined as its set of keywords $K_i$.

In predictive analytics, as the set of events E is received, it is to be determined whether an event $e_i$ is interesting (e.g., of particular relevance in a given context). In accordance with implementations of the present disclosure, an event is determined to be relevant, if the keywords of the event falls into a set of predefined keywords with certain probability. In this example, there are multiple possibilities for a keyword: either the keyword is relevant, or the keyword is not relevant. This can be referred to as a Bernoulli trial. A Bernoulli trial that is repeated multiple times for a set of keywords, can be modeled as a binomial experiment.

In accordance with implementations of the present disclosure, when an event arrives, the probability of each keyword within that event is determined with respect to the set of predefined keywords. In accordance with implementations of the present disclosure, the probability for each keyword is calculated, and is stored in a SPLAY tree, described above. That is, as an event is received, the SPLAY tree can be searched to determine a probability for each keyword of the event as represented by the SPLAY tree. In this manner, the probabilities of keywords of events are determined from a look-up of the SPLAY tree, and are not calculated as events are received.

The probability (p) of the first keyword can be calculated as:

$$p_1 = \binom{n_1}{x_1}(p)^{x_1}(q)^{n_1-x_1}$$

where p represents the probability of a keyword being relevant, q represents the probability of a keyword not being relevant, n represents the number of trials, and x represents the number of successes (e.g., the keyword is relevant). In some implementations, weighted probabilities are assigned to distinguish these keywords (relevant keywords) from other keywords, such that, for example, p=0.99, and q=0.01.

In some implementations, for the $j^{th}$ keyword, the probability can be provided as:

$$p_j = \binom{n_j}{x_j}(p)^{x_j}(q)^{n_j-x_j}$$

Here, $p_k$ is the probability of a number of keywords that make an event interesting, and ($1-p_k$) is the probability of the event being not interesting. In accordance with implementations of the present disclosure, the probabilities can be multiplied with weighted probabilities to distinguish them from normal (not interesting) keywords. For example:

$$p^*_k = P_k * T_w$$

where $T_w$ is the applied weight (e.g., $T_w$=0.90). In further detail, each probability is multiplied with the weight, such that the separation of interesting from un-interesting keywords within an event becomes more prominent. Accordingly, $p_k$ is the actual probability of a keyword being interesting or not. But, on top of that, $p_k$ is multiplied with, for example, 0.9 to make it a prominently interesting keyword (e.g., if the keyword is included in the predefined keyword list), and, for example, 0.1 to make it less prominent (e.g., if the keyword is absent from the predefined keyword list). In this manner, it can be ensured that the keywords with probability close to the middle (e.g., $p_k$=0.65, or $p_k$=0.6) should be marked clearly as interesting, so that they can clearly define a whole event as interesting or not.

In accordance with implementations of the present disclosure, an event, as a collection of keywords, is either relevant, or irrelevant, which can be determined based on a joint probability of the constituent keywords. In some implementations, a joint probability for an event is based on multinomial distribution, and is provided as:

$$P_e = \frac{p_1 \cdot p_2 \cdot \ldots \cdot p_m}{(p_1 \cdot p_2 \cdot \ldots \cdot p_m) + ((1-p)_1 \cdot (1-p)_2 \cdot \ldots \cdot (1-p)_m)}$$

The joint probability for the event is compared to a threshold T (e.g., T=0.90). In some examples, if the joint probability exceeds the threshold, the event is determined to be relevant, and if the joint probability does not exceed the threshold, the event is determined to be not relevant.

Figure 2:
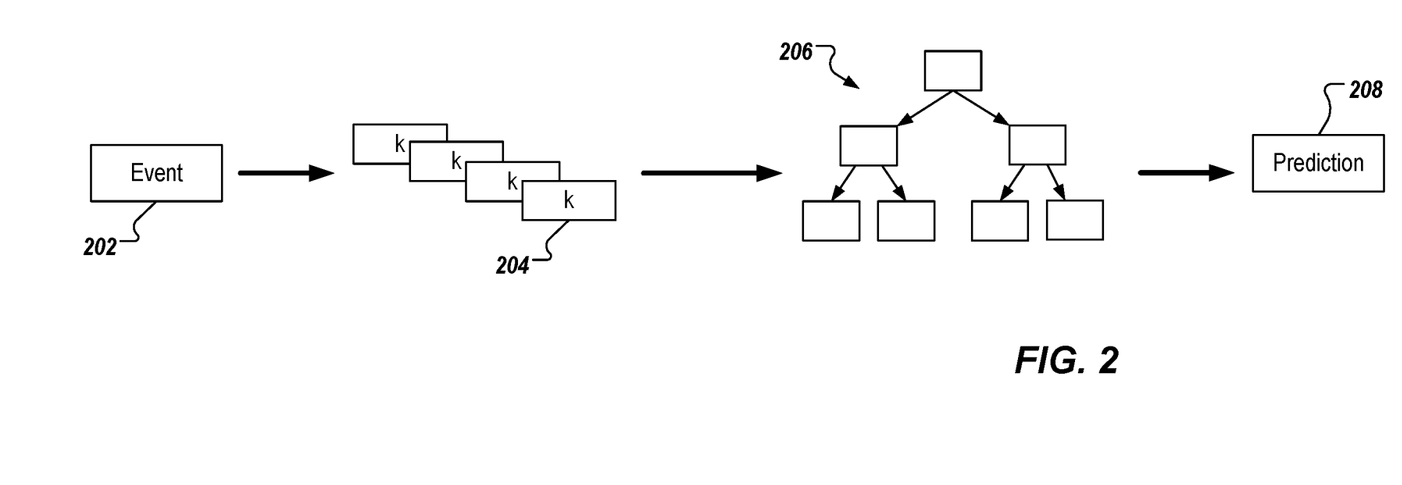
FIG. 2 depicts an example workflow in accordance with implementations of the present disclosure.

FIG. 2 depicts an example workflow 200 in accordance with implementations of the present disclosure. In some examples, the example workflow 200 can be performed by a real-time data processing system (e.g., hosted on the server system 104 of FIG. 1). An example real-time data processing system includes Apache Storm provided by the Apache Software Foundation, which can be described as an open source, distributed real-time computation system.

The example workflow 200 conceptually depicts processing of an event 202, which includes a set of keywords including one or more keywords 204. In some examples, the event 202 is provided from log data for a system, and can be provided as the log data is received. Example systems can include, but are not limited to, enterprise systems (e.g., an enterprise resource planning (ERP) system), a communication system (e.g., an email system), and software systems (e.g., cloud-hosted, microservice-based applications). In some examples, events are received in real-time. For example, as an event is added to a log, the event is provided for prediction processing through the real-time data processing system, as described herein.

In accordance with implementations of the present disclosure, probabilities are determined for one or more keywords 204 from a SPLAY tree 206. In some examples, the SPLAY tree 206 is representative (models) a particular event (e.g., security breach, software failure, spam message). In some examples, each keyword 204 is looked up in the SPLAY tree 206. If the keyword 204 is present in the SPLAY tree 206, the respective probability value is provided for the keyword 204. In some examples, if a keyword 204 is not present in the SPLAY tree 206, that keyword 204 is not considered in determining the joint probability for the event. Accordingly, a probability value is provided for one or more keywords in the set of keywords, but not necessarily all keywords in the set of keywords.

A prediction 208 is provided based on the probabilities returned form the SPLAY tree 206. More particularly, a joint probability for the event ($P_e$) is determined based on the probabilities of the individual keywords 204 (e.g., keywords 204, for which a probability is returned from the SPLAY tree). The joint probability is compared to a threshold (T) to provide the prediction 208. In some examples, the prediction is whether the event is a relevant event. For example, if the joint probability exceeds the threshold, the event is determined to be relevant, and if the joint probability does not exceed the threshold, the event is determined to be not relevant. In one example, the SPLAY tree 206 can correspond to a software failure, and, if the joint probability of the event exceeds the threshold it is determined that the event corresponds to a software failure. In this manner, as events are received in real-time, it can be quickly and resource-efficiently be determined whether each is relevant to a particular context.

Although FIG. 2 depicts a single SPLAY tree 206, the event 202 (e.g., the keywords 204 of the event 202) can be compared to multiple SPLAY trees to provide respective joint probabilities. For example, a first SPLAY tree can correspond to a software failure, and a second SPLAY tree can correspond to a security breach. Probabilities for keywords of the event can be determined from each SPLAY tree, and a first joint probability and a second joint probability can be determined. Each of the first joint probability and the second joint probability can be compared to the threshold to determine whether the event is relevant to a software failure, and/or a security breach, for example.

Figure 3:
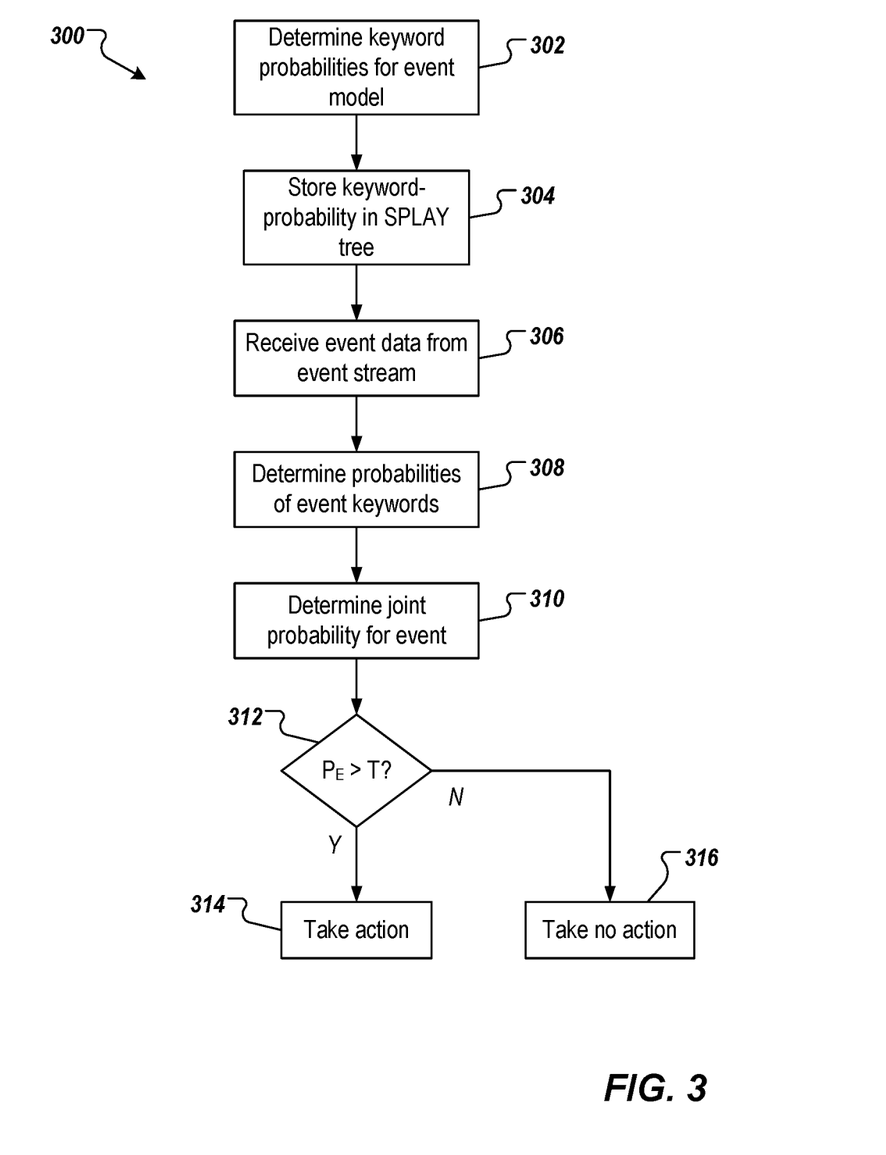
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. The example process 300 can be performed to determine whether an event is a relevant event to a particular context (e.g., security, spam, defect).

Keyword probabilities are determined to provide an event model (302). For example, historic event data is processed to determine probabilities for keywords associated with the historic event data. In some examples, the probabilities are determined using the relationship $$p_j = \binom{n_j}{x_j}(p)^{x_j}(q)^{n_j-x_j}$$

as described herein. In some examples, the historic data corresponds to a particular type of event (e.g., security breach, spam, software failure). The keywords and respective probabilities are stored in a SPLAY tree (304). In some examples, the SPLAY tree is a model of the particular event.

Event data is received from an event stream (306). For example, as events occur within a system, a set of keywords can be provided for each event as at least a portion of event data. The event data can be provided to an event processing system (e.g., a real-time data processing system (Apache Storm)). Probabilities are determined for one or more keywords in the set of keywords for the event (308). For example, a look-up is performed using a respective SPLAY tree (e.g., a SPLAY tree representative a type of event) to determine the probabilities. A joint probability is determined for the event (310). In some examples, and as described herein, the probabilities provided from the SPLAY tree are used to determine the joint probability for the event.

The joint probability is compared to a threshold (312). If the joint probability exceeds the threshold, the event is relevant to the type of event, and one or more actions are taken (314). In some examples, an action may depend on the type of event. For example, if the event corresponds to receipt of a spam email message, an action may include filtering the email message. As another example, if the event corresponds to a software failure, an action may include alerting an administrator as to the failure, and/or commissioning a back-up application to maintain operation of the system, while the software failure is addressed. In some examples, an action can include the real-time data processing system transmitting a message (alert) to a system affected by the event. If, however, the joint probability does not exceed the threshold, the event is not relevant to the type of event, and no action is taken (316).

Implementations of the present disclosure provide one or more of the following example advantages. In some examples, the probabilistic model of the present disclosure enables real-time event detection (e.g., failure, anomaly, spam) in event logs. More particularly, efficiencies afforded by use of the SPLAY tree, as well as in relatively lean training of the probabilistic model reduce the amount of computing resources (e.g., processors, memory) required to execute the model. This lower burden on computing resources enables the probabilistic model to be used in real-time (e.g., on a cloud infrastructure). Other approaches analyze each event individually, which requires significant time, resources and power.

Figure 4:
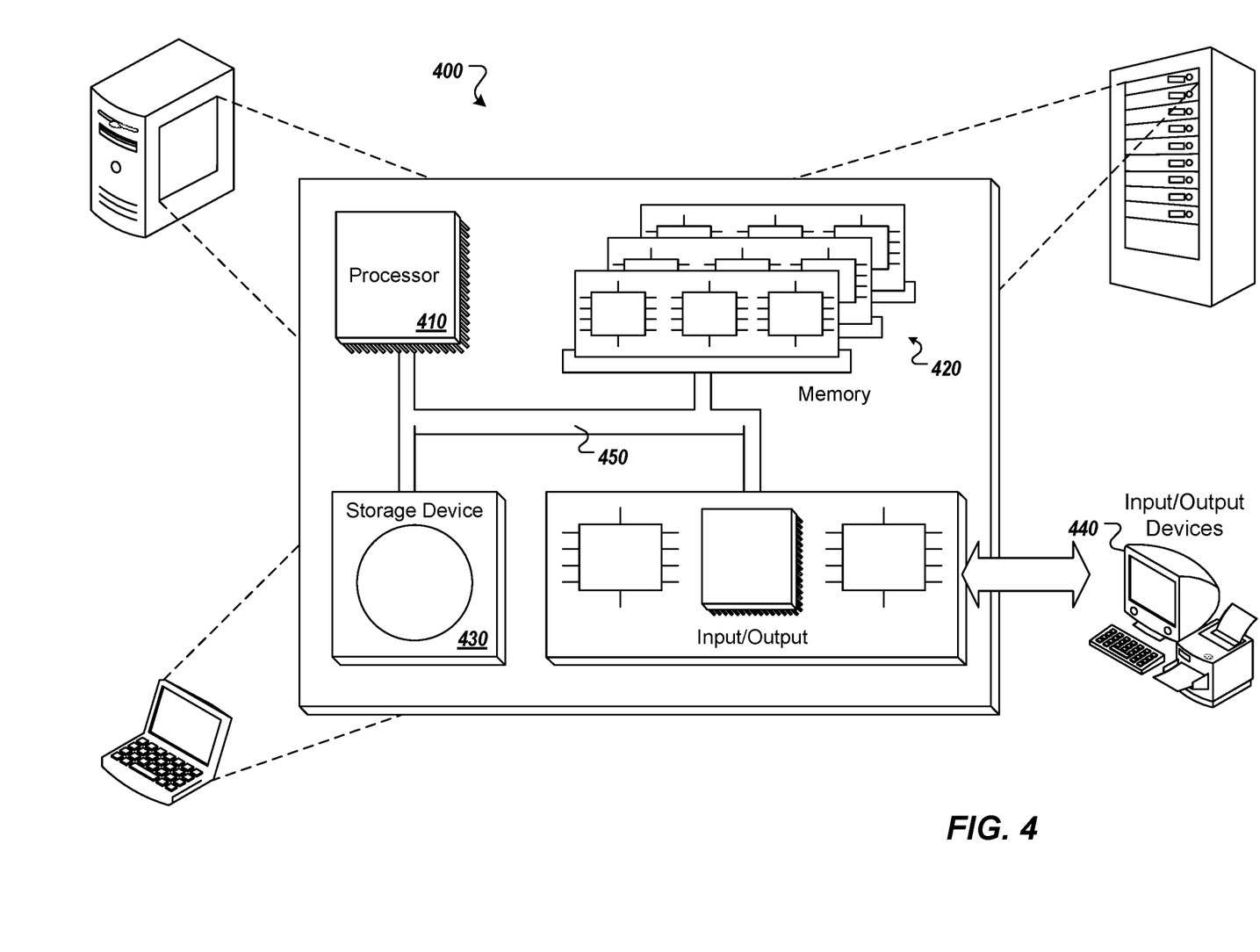
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for predicting a type of an event in a computer-implemented system, the method being executed by one or more processors and comprising:
   receiving, by the one or more processors, event data comprising a set of features representative of an event;
   for each feature in the set of features, looking-up a probability within a data structure to provide a set of probabilities, each probability representing a relevance of a respective feature to a type of event and being in a feature-probability pair of a plurality of feature-probability pairs stored in the data structure, each probability having been previously calculated from a set of historical events based on a relevancy probability and an irrelevancy probability with respect to the type of event to obviate calculating probabilities as events are received;
   providing, by the one or more processors, a joint probability that is calculated in a multinomial distribution at least partially based on a set of probabilities, each probability in the set of probabilities comprising a probability that a respective feature is relevant to the type of event and being weighted by a weight that is selected based on whether the respective feature is included in a predefined feature list, the joint probability indicating a likelihood that the event is of the type of event;
   comparing, by the one or more processors, the joint probability to a threshold to provide a comparison; and
   selectively executing, by the one or more processors, one or more actions based on the comparison.

2. The method of claim 1, wherein the data structure comprises a SPLAY tree, each node of the SPLAY tree comprising a feature-probability pair of the plurality of feature-probability pairs.

3. The method of claim 1, further comprising processing historical event data representative of historical events in the set of historical events to determine probabilities, and storing the probabilities in the data structure.

4. The method of claim 3, wherein the historical data is processed using a multinomial distribution.

5. The method of claim 1, wherein the type of event comprises one or more of a security risk, a software failure, and a spam message.

6. The method of claim 1, wherein the event data is received by a real-time data processing system that is executed by the one or more processors.

7. The method of claim 1, wherein features comprise keywords associated with the event.

8. A non-transitory computer-readable storage medium coupled to one or more processors and having instructions stored thereon which, when executed by the one or more processors, cause the one or more processors to perform operations for predicting a type of an event in a computer-implemented system, the operations comprising:
receiving event data comprising a set of features representative of an event;
for each feature in the set of features, looking-up a probability within a data structure to provide a set of probabilities, each probability representing a relevance of a respective feature to a type of event and being in a feature-probability pair of a plurality of feature-probability pairs stored in the data structure, each probability having been previously calculated from a set of historical events based on a relevancy probability and an irrelevancy probability with respect to the type of event to obviate calculating probabilities as events are received;
providing a joint probability that is calculated in a multinomial distribution at least partially based on a set of probabilities, each probability in the set of probabilities comprising a probability that a respective feature is relevant to the type of event and being weighted by a weight that is selected based on whether the respective feature is included in a predefined feature list, the joint probability indicating a likelihood that the event is of the type of event;
comparing the joint probability to a threshold to provide a comparison; and
selectively executing one or more actions based on the comparison.

9. The computer-readable storage medium of claim 8, wherein the data structure comprises a SPLAY tree, each node of the SPLAY tree comprising a feature-probability pair of the plurality of feature-probability pairs.

10. The computer-readable storage medium of claim 8, wherein operations further comprise processing historical event data representative of historical events in the set of historical events to determine probabilities, and storing the probabilities in the data structure.

11. The computer-readable storage medium of claim 10, wherein the historical data is processed using a multinomial distribution.

12. The computer-readable storage medium of claim 8, wherein the type of event comprises one or more of a security risk, a software failure, and a spam message.

13. The computer-readable storage medium of claim 8, wherein the event data is received by a real-time data processing system that is executed by the one or more processors.

14. The computer-readable storage medium of claim 8, wherein features comprise keywords associated with the event.

15. A system, comprising:
a computing device; and
a computer-readable storage device coupled to the computing device and having instructions stored thereon which, when executed by the computing device, cause the computing device to perform operations for predicting a type of an event in a computer-implemented system, the operations comprising:
receiving event data comprising a set of features representative of an event;
for each feature in the set of features, looking-up a probability within a data structure to provide a set of probabilities, each probability representing a relevance of a respective feature to a type of event and being in a feature-probability pair of a plurality of feature-probability pairs stored in the data structure, each probability having been previously calculated from a set of historical events based on a relevancy probability and an irrelevancy probability with respect to the type of event to obviate calculating probabilities as events are received;
providing a joint probability that is calculated in a multinomial distribution at least partially based on a set of probabilities, each probability in the set of probabilities comprising a probability that a respective feature is relevant to the type of event and being weighted by a weight that is selected based on whether the respective feature is included in a predefined feature list, the joint probability indicating a likelihood that the event is of the type of event;
comparing the joint probability to a threshold to provide a comparison; and
selectively executing one or more actions based on the comparison.

16. The system of claim 15, wherein the data structure comprises a SPLAY tree, each node of the SPLAY tree comprising a feature-probability pair of the plurality of feature-probability pairs.

17. The system of claim 15, wherein operations further comprise processing historical event data representative of historical events in the set of historical events to determine probabilities, and storing the probabilities in the data structure.

18. The system of claim 17, wherein the historical data is processed using a multinomial distribution.

19. The system of claim 15, wherein the type of event comprises one or more of a security risk, a software failure, and a spam message.

20. The system of claim 15, wherein the event data is received by a real-time data processing system that is executed by the one or more processors.

* * * * *